United States Patent
Wycech

[11] Patent Number: 6,079,180
[45] Date of Patent: Jun. 27, 2000

[54] LAMINATE BULKHEAD WITH FLARED EDGES

[75] Inventor: Joseph S Wycech, Grosse Pointe Woods, Mich.

[73] Assignee: Henkel Corporation, Gulph Mills, Pa.

[21] Appl. No.: 09/257,920

[22] Filed: Feb. 26, 1999

Related U.S. Application Data

[60] Provisional application No. 60/086,496, May 22, 1998.

[51] Int. Cl.[7] .................................. B60J 1/00; E04C 1/00
[52] U.S. Cl. ...................... 52/731.6; 52/309.8; 52/309.9; 52/309.11; 52/783.1; 296/187; 296/191; 296/205; 296/203.01
[58] Field of Search ..................................... 296/187, 191, 296/205, 203.01, 204; 52/783.1, 309.8, 731.6, 309.9, 309.11

[56] References Cited

U.S. PATENT DOCUMENTS

| | | | |
|---|---|---|---|
| 3,054,636 | 9/1962 | Wessels | 296/204 |
| 3,746,387 | 7/1973 | Schwenk | 296/204 |
| 3,757,559 | 9/1973 | Welsh | 72/379.2 |
| 3,890,108 | 6/1975 | Welsh | 428/593 |
| 4,440,434 | 4/1984 | Celli | 296/185 |
| 4,457,555 | 7/1984 | Draper | 296/186 |
| 4,613,177 | 9/1986 | Loren et al. | 293/120 |
| 4,705,716 | 11/1987 | Tang | 442/224 |
| 4,917,435 | 4/1990 | Bonnett et al. | 296/190 |
| 4,989,913 | 2/1991 | Moore, III | 296/205 |
| 5,102,188 | 4/1992 | Yamane | 296/205 |
| 5,213,391 | 5/1993 | Takagi | 296/205 |
| 5,560,672 | 10/1996 | Lim et al. | 296/189 |
| 5,575,526 | 11/1996 | Wycech . | |
| 5,649,400 | 7/1997 | Miwa | 52/406.1 |
| 5,652,039 | 7/1997 | Tremain et al. | 428/121 |
| 5,755,486 | 5/1998 | Wycech . | |
| 5,806,915 | 9/1998 | Takabatake | 296/187 |
| 5,806,919 | 9/1998 | Davies | 296/205 |
| 5,884,960 | 3/1999 | Wycech . | |
| 5,888,600 | 3/1999 | Wycech . | |
| 5,901,528 | 5/1999 | Richardson | 52/783.1 |

*Primary Examiner*—Christopher Todd Kent
*Assistant Examiner*—Jennifer I. Thissell
*Attorney, Agent, or Firm*—Wayne C. Jaeschke; Stephen D. Harper; Harold Pezzner

[57] ABSTRACT

A laminate bulkhead comprises an expandable polymer sandwiched between two stiff members which are of a structure so that the expandable polymer is flared out or thicker in the area or along the line where the polymer expands and is bonded to the walls of a hollow structure in which the bulkhead is placed. The direction of expansion of the polymer results from the polymer being constrained by the stiff members on either side of the expanding polymer.

22 Claims, 3 Drawing Sheets

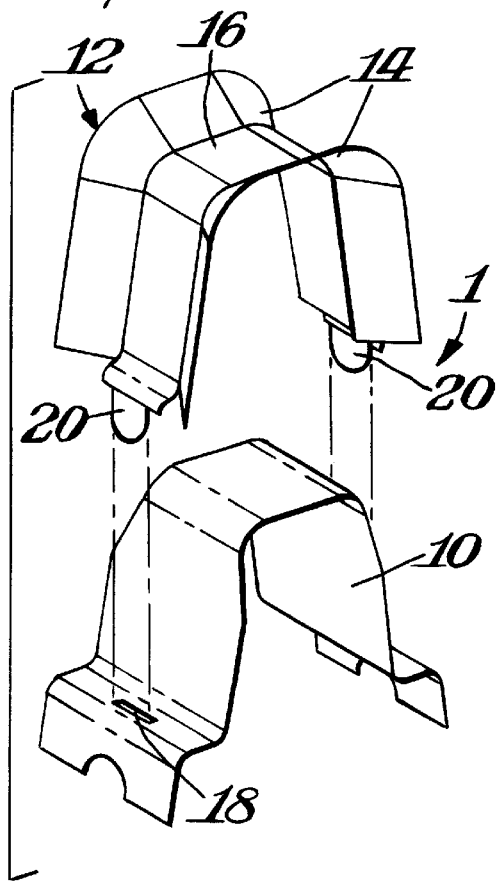
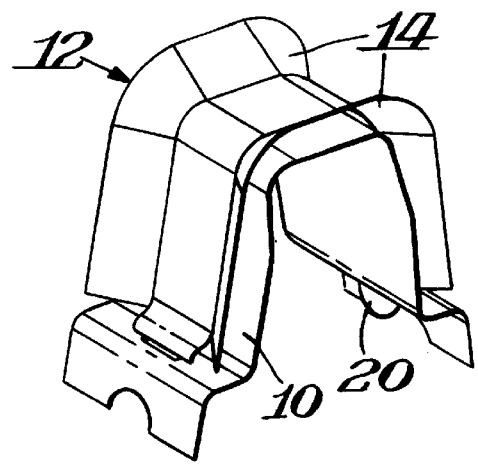
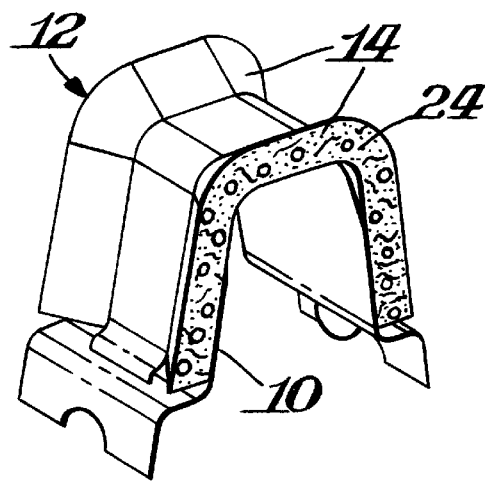

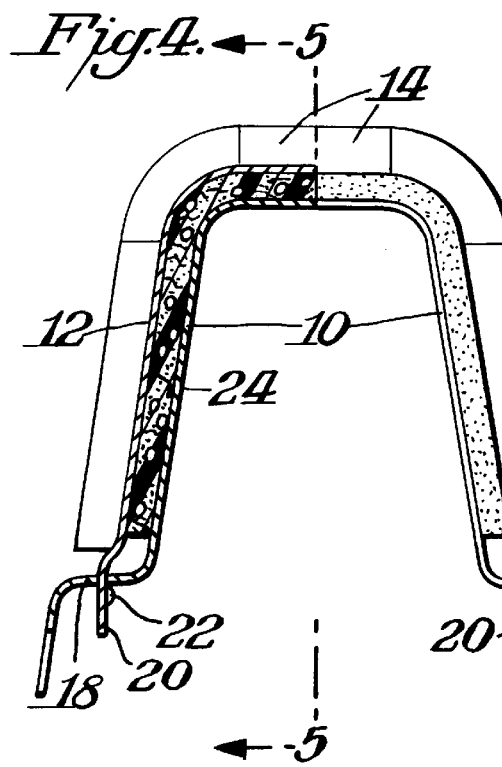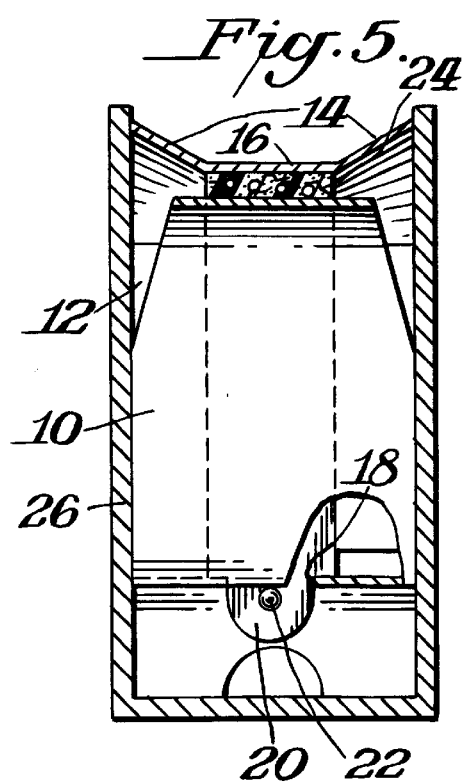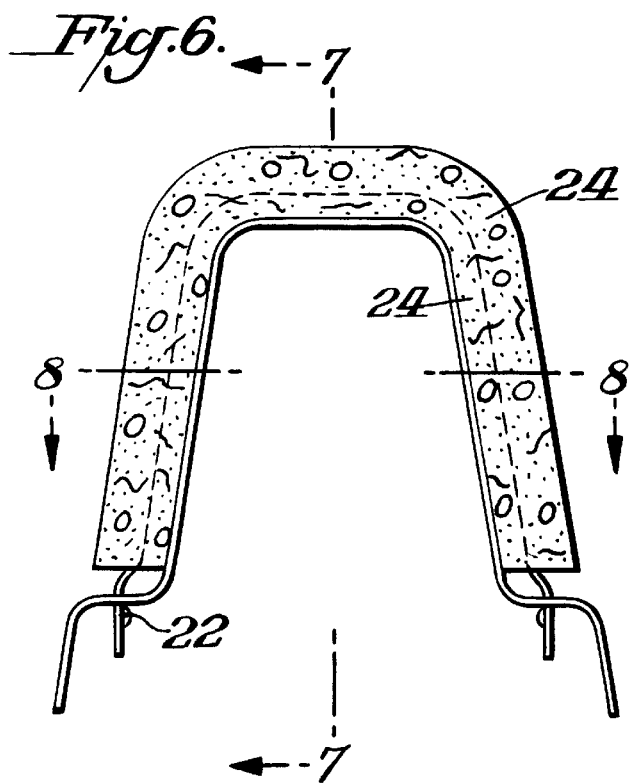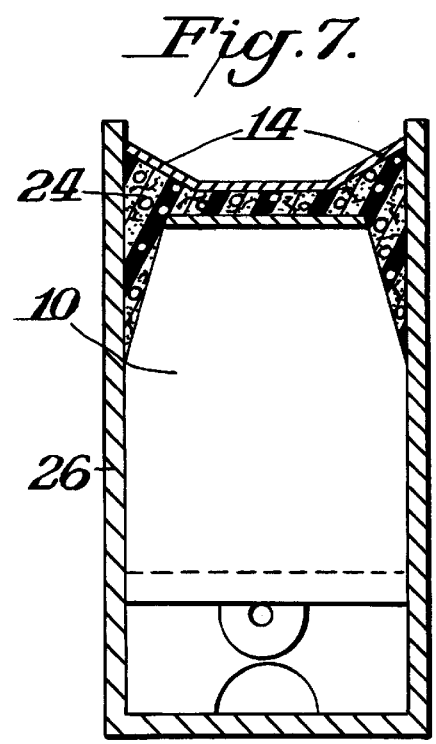

LAMINATE BULKHEAD WITH FLARED EDGES

CROSS-REFERENCE TO RELATED APPLICATION

This application is based upon provisional application Serial No. 60/086,496, filed May 22, 1998.

BACKGROUND OF THE INVENTION

In various practices, such as the automotive industry it is desired to stiffen parts. For example, certain parts may have spaced walls and it would be desirable to have some reinforcement between the spaced walls. Ideally, such reinforcements should be easy to apply and should effectively function without adding significant weight to the hollow structure being reinforced.

SUMMARY OF THE INVENTION

An object of this invention is to provide a reinforcing structure for various parts, such as used in the automotive field.

A further object of this invention is to provide such a reinforcing structure which can be easily assembled without sacrifice to its effectiveness.

In accordance with this invention an expandable polymer material is sandwiched between two stiff or rigid members. Preferably when the polymer expands the resultant foam is flared out or is thicker in the area or along the line where the polymer expands into a rigid structural foam which bonds to the inside wall of the structural member that is being reinforced.

THE DRAWINGS

FIG. 1 is an exploded view of a laminate bulkhead with flared edges in accordance with this invention;

FIG. 2 is a perspective view of the bulkhead shown in FIG. 1 in the assembled condition, but without the polymer layer;

FIG. 3 is a view similar to FIG. 2 after expansion of the polymer;

FIG. 4 is a cross-sectional view in elevation of the bulkhead shown in FIG. 3;

FIG. 5 is a cross-sectional view taken through FIG. 4 along the line 5—5 showing the laminate bulkhead mounted in a structural member;

FIG. 6 is an end elevational view showing the polymer expanded into the flared edges of the bulkhead in the arrangement shown in FIGS. 1–5;

FIG. 7 is a cross-sectional view taken through FIG. 6 along the line 7—7; and

DETAILED DESCRIPTION

Figure 8:
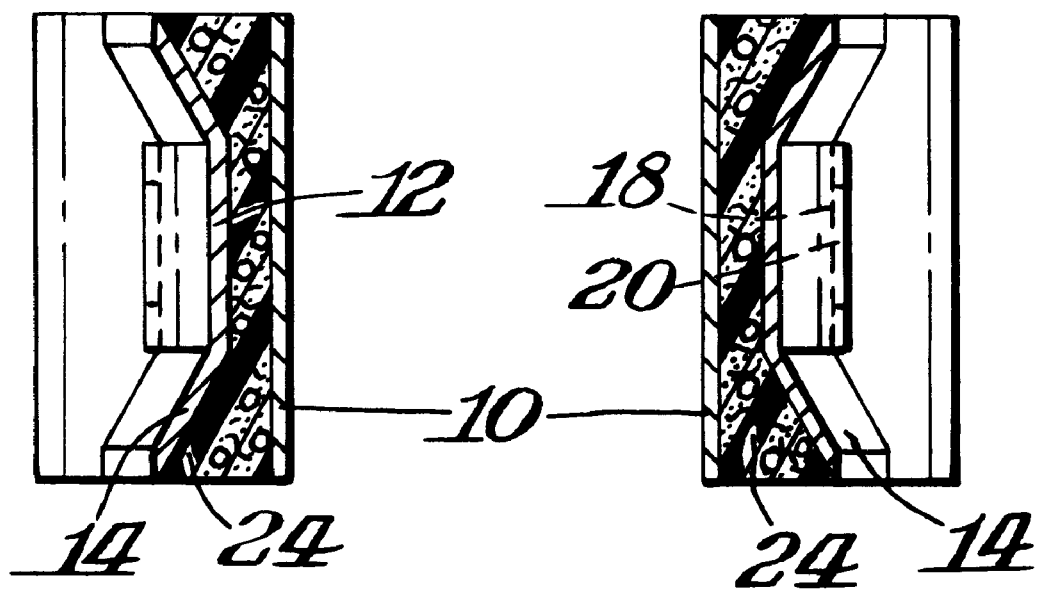
FIG. 8 is a cross-sectional view taken through FIG. 6 along the line 8—8.

The present invention relates to providing a reinforcing structure through the use of a sandwich created by providing an expandable foam or polymer between two stiff layers. Such stiff layers could be of any suitable material such as metal, plastic or fiberglass which has sufficient rigidity. The invention may have various uses including, but not limited to, various automotive uses such as the uses of my Ser. No. 08/675,173, filed Jul. 3, 1996 and Ser. No. 09/103,032 filed Jun. 23, 1998 and Ser. No. 09/074,616, filed May 7, 1998, all of the details of which are incorporated herein by reference thereto. Preferably, the expandable polymer is heat expandable. The invention, however, may be practiced where the expansion is chemically activated.

In general, the invention involves having the expandable polymer flared out or thicker in the area or along the line where the polymer expands and bonds to the inside wall of the member that the bulkhead is reinforcing. The polymer is forced to expand in the plane of the bulkhead and is constrained by the stiff layers on either side of the expanding polymer. The result is to provide an effective means of tying opposing walls of a hollow member to each other.

Where the invention is used in the automotive industry advantage could be had of various heating steps which are otherwise employed to cause activation of a heat expandable polymer. Alternatively, as noted above, the expansion could result from means other than heating such as by chemical activation.

The drawings illustrate one practice of the invention which results in a laminate bulkhead 1 with flared edges. FIG. 1 is an exploded view of a two piece stamping which includes a generally U-shaped inner rigid or stiff base member 10 and a generally U-shaped outer rigid or stiff cover member 12. Each member has downwardly extending legs interconnected by an intermediate portion. Outer member 12 includes a pair of outwardly diverging flared side edges 14,14 connected by an intermediate or central generally U-shaped portion 16. U-shaped central portion 16 generally conforms in size and shape to the inner base member 10 except that it is narrower than inner member 10 with each flared side edge 14 extending outwardly away from base member 10 and terminating in the same plane as the outer edge of member 10. See FIGS. 5 and 7. If desired, the base member may also have flared edges similar to edges 14,14 which would terminate in the same plane as edges 14,14. Alternatively, members 10 and 12 may be reversed such that the cover member 12 has no flared edges, while base member 10 may have flared edges.

In the illustrated embodiment inner member 10 includes a slot 18 on a horizontal shoulder of each leg of a size and shape to receive a tab 20 at the end of each leg of outer member 12. If desired, tabs 20 could have a locking element such as a dimple 22 to firmly connect inner member 10 and outer member 12 together and minimize any disconnection after the parts or members are snapped together. See, for example, FIGS. 4–7. Alternatively, base member 10 may include tabs fitting into slots in the cover member 12.

In accordance with this invention a layer of polymer material 24 is provided on either the inner surface of outer member 12 or the outer surface of inner member 10. Such foam material may be of the type disclosed in my aforenoted patent applications to function as a rigid reinforcement structural foam. The foam material 24 is applied to its carrier member 10 or 12 in unexpanded form. The inner member 10 and outer member 12 are then assembled together by insertion of the tabs 20 into the corresponding slots 18. Upon activation of the foam, such as from the heat encountered in an e-coating which is conventionally done in automotive manufacturing, the foam expands into intimate contact with both the inner surface of outer member 12 and outer surface of inner member 10. Because of the geometry of the two outer layers 10,12 the expanded foam is flared out or thicker in the area or along the line where the polymer expands and is bonded to the inside walls 26,26 of a hollow structural member that the bulkhead is reinforcing. The polymer is forced to expand in the plane of the bulkhead and is constrained by the stiff layers 10,12 on either side of the expanding polymer. This action is illustrated in various figures. The result of the invention is to provide an effective means of tying opposing walls 26,26 of a hollow member to each other. FIG. 5, for example, illustrates the polymer 24 spaced inwardly before expansion. FIG. 7, however, shows the polymer 24 expanded into a structural reinforcement foam intimately bonded to the walls 26,26 as well as the member 10,12.

Because members 10,12 are locked together, the spacing between them is fixed. Thus, polymer 24 is disposed in a rigid channel. Accordingly, when polymer 24 expands it is restrained from moving in a thickness direction and is forced to move outwardly toward the edges of members 10,12, thus assuring making intimate bonding contact with walls 26,26.

Although the drawings illustrate a preferred practice of the invention, the invention may be practiced in other manners. For example, the base member and cover member could be locked together to form a saddle without either member being flared and with the members being completely parallel to each other over most of their area. This arrangement would still have the advantage of forcing the foam to expand laterally. The figures illustrate the bulkhead 1 to be shaped to fit in a channel having parallel sides, such as sides 26,26 in FIGS. 5 and 7. The channel and the bulkhead, however, could have other shapes wherein the bulkhead conforms to channels with other wall relationships, such as outwardly tapered walls. Where the bulkhead is in a tapered channel the end edges of both members are preferably coplanar with the plane at the angle of the tapered channel. Where the channel has an irregular shape, the end edges would preferably conform to the irregular shape and need not be coplanar.

Although the invention has been described with respect to reinforcing automotive structural members, the invention may be practiced in other fields where such a reinforcement would be desirable.

What is claimed is:

1. A laminate bulkhead comprising a stiff base member having longitudinal side edges, a stiff cover member mounted over and spaced from said base member, said cover member having longitudinal side edges, one of said members having at least one of said side edges flared outwardly away from said side edges of the other of said members, each of said members having a central portion, each members being located closer to each other at said central portions than at said at least one side edge, a structural reinforcement foam located between and bonded to said base member and said cover member, said structural reinforcement foam being formed from an expandable polymer, and said members constraining the direction of expansion of said expandable polymer whereby said structural reinforcement foam is thicker at said at least one side edge than at said central portions.

2. The laminate bulkhead of claim 1 wherein said base member and said cover member terminate in side edge edges which are coplanar with each other on both sides of said central portions.

3. The laminate bulkhead of claim 1 wherein the spacing between said central portions is uniform.

4. The laminate bulkhead of claim 1 wherein said base member and said cover member are inter-locked to maintain the spacing between them fixed.

5. The laminate bulkhead of claim 1 wherein said base member has said flared edges.

6. The laminate bulkhead of claim 1 wherein said polymer is heat expandable and is hard and rigid when bonded to said base member and said cover member.

7. The laminate bulkhead of claim 1 wherein said one of said members has said side edges flared outwardly on each side of said central portion.

8. A laminate bulkhead comprising a stiff base member, a stiff cover member mounted over and spaced from said base member, one of said members having said edges flared outwardly away from the other of said members, each of said members having a central portion, said members being located closer to each other at said central portions than at said flared edges, a structural reinforcement foam located between and bonded to said base member and said cover member, said structural reinforcement foam being formed from an expandable polymer, said members constraining the direction of expansion of said expandable polymer whereby said structural reinforcement foam is thicker at said flared ends than at said central portions, said base member and said cover member terminating in said edges which are coplanar with each other on both sides of said central portions, the spacing between said central portions being uniform, said base member and said cover member being inter-locked to maintain the spacing between them fixed, said one of said members has said end edges flared outwardly on each side of said central portion, and one of said members includes a tab which fits into a slot in the other of said members to interlock said members together.

9. The laminate bulkhead of claim 8 wherein said base member and said cover member are each generally U-shaped having downwardly extending legs and an upwardly located connecting portion between said legs, and each of said downwardly extending legs including said interlocking tab/slot structure.

10. The laminate bulkhead of claim 9 wherein said base member has a generally horizontal shoulder on each of its legs, one of said slots being in each of said horizontal shoulders, and each of said legs of said cover member having a downwardly extending tab for fitting in its respective said slot.

11. The laminate bulkhead of claim 10 including a dimple on each of said tabs for minimizing the tendency of said tabs to be removed from said slots.

12. The laminate bulkhead of claim 11 in combination with a hollow member having a pair of spaced walls, said laminate bulkhead being disposed in said hollow member with said end edges of each of said members being disposed against said walls, and said structural foam being intimately bonded to said members and to said walls.

13. A laminate bulkhead comprising a stiff base member, a stiff cover member mounted over and spaced from said base member, one of said members having said edges flared outwardly away from the other of said members, each of said members having a central portion, said members being located closer to each other at said central portions than at said flared edges, a structural reinforcement foam located between and bonded to said base member and said cover member, said structural reinforcement foam being formed from an expandable polymer, said members constraining the direction of expansion of said expandable polymer whereby said structural reinforcement foam is thicker at said flared ends than at said central portions, in combination with a hollow member having a pair of spaced walls, said laminate bulkhead being disposed in said hollow member with said end edges of each of said members being disposed against said walls, and said structural foam being intimately bonded to said members and to said walls.

14. A laminate bulkhead comprising a stiff base member, a stiff cover member mounted over and spaced from said base member, each of said members having a central portion disposed between side edges, said central portion terminating in opposite ends, a structural reinforcement foam located between and bonded to said base member and said cover member, said structural reinforcement foam being formed from an expandable polymer, and said base member and said cover member being interlocked at said ends to maintain the spacing between them fixed and to constrain the direction of expansion of said expandable polymer when said polymer expands so that said expandable polymer may only expand laterally.

15. The laminate bulkhead of claim 14 wherein said base member and said cover member are parallel to each other at said central portions and at said side edges.

16. The laminate bulkhead of claim 15 wherein each of said base member and said cover member is generally U-shaped whereby said laminate bulkhead is generally saddle shaped.

17. The laminate bulkhead of claim 14 wherein said expandable polymer is hard and rigid when bonded to said base member and said cover member.

18. A method of reinforcing a structural member having a pair of spaced walls comprising the steps of providing a stiff base member having a central portion and a longitudinal side edge portion on each lateral side of the central portion, providing a layer of expandable polymer on the central portion, mounting a stiff cover member over the layer of polymer and underlying base member, interlocking the cover member and the base member to each other to form a rigid channel which constrains and directs the outward movement of the polymer upon expansion into a structural reinforcing foam, one of the base member and cover member being outwardly flared edges at at least one of its side each portions, mounting the bulkhead laminate created by the interlocking of the base member and cover member together with the polymer there between into the hollow structural member with the ends of the bulkhead laminate being in contact with the spaced walls, and expanding the polymer into a rigid structural reinforcement foam which is intimately bonded to the spaced walls and to the cover member and base member.

19. The method of claim 18 including heating the bulkhead laminate to cause expansion of the foam.

20. A method of reinforcing a structural member having a pair of spaced walls comprising the steps of providing a stiff base member having a central portion and a side portion on each lateral side of the central portion, providing a layer of expandable polymer on the central portion, mounting a stiff cover member over the layer of polymer and underlying base member, interlocking the cover member and the base member to each other to form a rigid channel which constrains and directs the outward movement of the polymer upon expansion into a structural reinforcing foam, one of the base member and cover member having outwardly flared edges at each of its said portions, mounting the bulkhead laminate created by the interlocking of the base member and cover member together with the polymer there between into the hollow structural member with the ends of the bulkhead laminate being in contact with the spaced walls, expanding the polymer into a rigid structural reinforcement foam which is intimately bonded to the spaced walls and to the cover member and base member, one of the base member and cover member containing a slot and the other of the base member and cover member containing a tab, and interlocking the base member and the cover member together by snapping the tab into the slot.

21. The method of claim 18 wherein the laminate bulkhead is of generally U-shaped form with each of the base member and the cover member having downwardly extending legs connected by an intermediate portion, each of the legs of the base member having a horizontal shoulder with a slot in each of the shoulders, each of the legs of the cover member terminating in a downwardly extending tab, and inserting the tabs on each leg of the cover member into a corresponding slot in each leg of the base member.

22. The method of claim 18 wherein the polymer is confined to the central portions of the bulkhead laminate before expansion.

* * * * *